PULSE SHORTENING GENERATOR

Filed July 31, 1958 4 Sheets-Sheet 1

INVENTORS
HANNON S. YOURKE
WILLIAM G. STROHM

BY Everett A. Gartrell

ATTORNEY

Jan. 23, 1962 H. S. YOURKE ET AL 3,018,390

PULSE SHORTENING GENERATOR

Filed July 31, 1958 4 Sheets-Sheet 2

PULSE SHORTENING GENERATOR

Filed July 31, 1958 4 Sheets-Sheet 3

Jan. 23, 1962 H. S. YOURKE ET AL 3,018,390

PULSE SHORTENING GENERATOR

Filed July 31, 1958 4 Sheets-Sheet 4

United States Patent Office 3,018,390

Patented Jan. 23, 1962

3,018,390

PULSE SHORTENING GENERATOR

Hannon S. Yourke and William G. Strohm, Poughkeepsie, N.Y., assignors to International Business Machines Corporation, New York, N.Y., a corporation of New York Filed July 31, 1958, Ser. No. 752,310
12 Claims. (Cl. 307—88.5)

The present invention is directed to pulse generators and, more particularly, to transistor pulse generators which are capable of developing trains of output pulses of controllable durations. While such generators have a variety of applications, they are particularly useful in computers for controlling or switching purposes.

A monostable trigger circuit, sometimes referred to as a "single-shot," is one form of a pulse generator. A triggering pulse causes the generator to change its operating state, after which circuit parameters return the generator to its original condition where it awaits the application of a succeeding triggering pulse. In prior such transistor pulse generators, the operation of the transistors entered into their saturated region and minority carrier storage effects prevented the transistors from changing from one operative state to the other as fast as was desired for some computer applications. Consequently the widths of the output pulses of those generators often were longer than could be tolerated. A typical pulse duration which was attained was about 1 microsecond whereas circuit requirements sometimes necessitated pulse durations as short as 100 millimicroseconds. Those same requirements sometimes also demanded that pulse widths be adjustable over a wide range of from about 100 millimicroseconds to 10 milliseconds. Pulse generators employing transistors operating in their saturated region were unable effectively to satisfy such requirements.

In prior pulse generators of the type under consideration, adjustable resistor capacitor networks were often used to control the durations of the output pulses. After the charging or the discharging of the capacitor of that network, as the case might be, it was desirable abruptly to restore the capacitor to its original state or potential in order quickly to condition the pulse generator and the network for the generation of a succeeding pulse. Prior generators were often unable to function in this manner and develop output pulses having not only a high repetition rate but also very short durations.

It is an object of the invention, therefore, to provide a new and improved pulse generator which avoids one or more of the above-mentioned disadvantages and limitations of prior such generators.

It is another object of the present invention to provide a new and improved transistor pulse generator which is capable of developing output pulses of adjustable durations.

It is a further object of the invention to provide a new and improved triggered transistor pulse generator capable of generating output pulses which not only have a high repetition rate but also durations adjustable over a relatively wide range.

It is yet another object of the invention to provide a new and improved transistor pulse generator which produces complementary output pulses.

It is an additional object of the invention to provide a new and improved triggered pulse generator employing an energy-storage network which has a fast recovery time after the generation of a pulse.

It is an important object of the present invention to provide a new and improved pulse generator employing transistors, the operation of which does not enter into the saturation region.

In accordance with a particular form of the invention, a transistor pulse generator comprises transistor means responsive to applied triggering pulses for deriving a pair of pulse-type output signals representative of the triggering pulses. The pulse generator also includes a first transistor channel coupled to the aforesaid means for translating one of the output signals, and a second channel which in turn includes a non-saturating transistor circuit having an adjustable time-constant network therein and responsive to the other of the output signals for deriving a pulse-type output signal having modified predetermined edge portions which are controlled by the adjustment of that network. The pulse generator further includes means conjointly responsive to the aforesaid one output signal and to the modified edge portions for developing a resultant pulse type signal during those edge portions.

Other objects of the invention will be pointed out in the following description and claims and illustrated in the accompanying drawings which disclose, by way of example, the principle of the invention and the best mode that has been contemplated of applying that principle.

Figure 1:
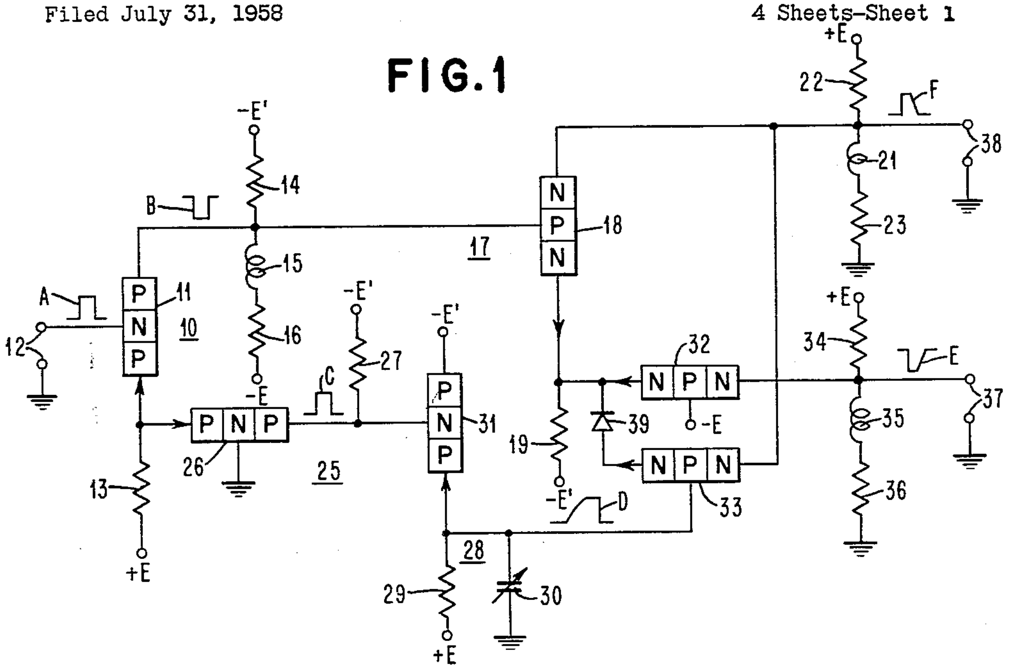
FIG. 1 is a circuit diagram of a pulse generator in accordance with a particular form of the invention.

*Description of FIG. 1 pulse generator*

Referring now more particularly to FIG. 1 of the drawings, the pulse generator there represented comprises transistor means 10 including a transistor 11 of one conductivity type, such as PNP junction transistor, responsive to applied triggering pulses for deriving a pair of pulse-type output signals representative of the triggering pulses. Transistor 11 has a base-input circuit, a pulse-type triggering signal being applied with positive polarity by way of the ungrounded one of a pair of terminals 12, 12 to the base of the transistor. The emitter is forward biased with reference to the base by an energizing source +E connected to the emitter through a resistor 13. The collector is reverse biased by a connection from an intermediate point on a voltage divider comprising a series combination of a resistor 14, a conventional peaking inductor 15, and a resistor 16 connected between the terminals of a source indicated as —E′, —E.

The pulse generator also includes a first transistor channel 17 having a transistor of the opposite conductivity type coupled to one of the output circuits of transistor 11, namely to the collector circuit thereof. This channel comprises the base-emitter circuit of an NPN transistor 18, the base being connected directly to the collector of transistor 11. The emitter of transistor 18 is connected to an energizing source —E′ through a resistor 19 which the collector is reverse biased by a connection to the junction of a resistor 22 and a peaking inductor 21 which are in series with a resistor 23, the series combination serving as a voltage divider between a source +E and ground.

The transistor pulse generator further includes a second channel 25, connected to the other or emitter output circuit of transistor 11, including a transistor circuit having an adjustable time-constant network therein and responsive to the other output signal of transistor 11 for deriving a pulse-type output signal having modified predetermined edge portions, to be described subsequently, which are controlled by the adjustment of the network. This second channel 25 includes a PNP transistor 26 having its base grounded, its emitter connected to the emitter of transistor 11, and its collector connected through a resistor 27 to a reverse biasing source —E′. This channel also includes a time-constant network 28 comprising a parallel-coupled resistor 29 and an adjustable capacitor 30 which preferably are connected in an emitter-follower circuit that effectively controls the charging and discharging of the capacitor 30 at unequal rates. The emitter-follower circuit includes a PNP transistor 31 having its base directly connected to the collector of transistor 26, its collector connected to a reverse-biasing source —E′, and its emitter connected through the resistor 29 to a forward biasing source +E. One terminal of the capacitor 30 is grounded.

The transistor pulse generator of FIG. 1 additionally includes means including a pair of transistors 32 and 33 which are of the opposite type from that of transistor 11, and hence are of the NPN type, that are conjointly responsive to the one output signal from the first transistor channel 17 and to the derived output signal with the modified edge portions from the second transistor channel 25 for developing a resultant pulse-type signal during those edge portions. The resultant signal will be made clear hereinafter with reference to FIG. 2. Transistor 32 has its emitter connected to that of the transistor 18, its base connected to a source of negative potential —E, and its collector connected through a resistor 34 to a reverse biasing source +E. The collector is also connected to ground through a peaking inductor 35 and a resistor 36 which complete the reverse biasing source. A pair of output terminals 37, 37, one of which is grounded and the other of which is connected to the collector of transistor 31, serve to supply output pulses of negative polarity to be described subsequently. Transistor 33 has its base connected directly to the emitter of transistor 31 and its emitter is connected to the emitter of transistor 32 through an isolating diode 39 poled as indicated. The diode may ordinarily be replaced by a conductor when alloy junction transistors are employed since they have a relatively high emitter-base voltage breakdown characteristic. However, the diode has utility when drift transistors are utilized for transistors 18, 32 and 33. The collector of transistor 33 is biased in the reverse direction by a connection to the junction of the resistor 22 and the inductor 21.

The pulse generator also includes means coupled to the first channel 17 for deriving a second pulse-type output signal which has a waveform that corresponds to that of the first output signal appearing at terminals 37, 37 but is of the opposite or positive polarity. This means includes the collector circuits of transistors 18 and 33 and a pair of terminals 38, 38, one of which is grounded and the other of which is connected directly to the collectors of the transistors 18 and 33.

*Explanation of operation of FIG. 1 pulse generator*

Figure 2:
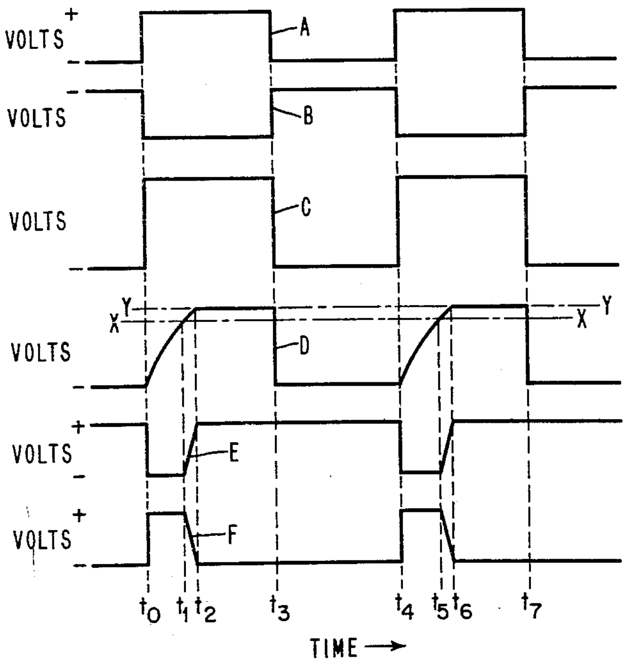
FIG. 2 is a timing chart which has an enlarged time scale and is utilized in explaining the operation of that generator.

In considering the operation of the pulse generator of FIG. 1, it will be understood that small voltage swings effect current control or switching in the various transistors. It will also be assumed initially that the operating potentials of the transistors are such that the transistors 11, 18, and 31 initially are conducting and that transistors 26, 32, and 33 are in their nonconductive state. The application of small positive triggering pulses such as those represented by curve A of FIG. 2 to the input terminals 12, 12 is effective to render the base of transistor 11 more positive than its emitter during the interval $t_0$–$t_3$ and this terminates the flow of current to the transistor. The collector potential swings negatively as represented by curve B. The termination of the flow of current from the source +E to the emitter of transistor 11 raises the potential of the emitter of transistor 26 sufficiently in a positive sense to cause the latter transistor to conduct current during the interval under consideration, and there is produced at its collector the amplified positive wave of curve C. Since the emitter-follower transistor 31 originally was conductive, the emitter electrode potential thereof was substantially equal to —E′ or that of its base prior to time $t_0$. Curve D of FIG. 2 represents the variation of the emitter potential of transistor 31. The application at time $t_0$ of the positive pulse of curve C to the base of transistor 31 drives the latter toward cutoff so that current now flows from the source +E through the resistor 29 into the capacitor 30. The capacitor charges exponentially in a positive direction as represented by curve D during interval $t_0$–$t_2$.

It will be helpful at this time to consider the operating conditions of the transistors 18 and 32 during the interval immediately following the time $t_0$ when the capacitor 30 is charging in a positive sense. Transistor 18 is rendered nonconductive during the interval $t_0$–$t_3$ by the small negative going pulse of curve B applied to its base. Its collector swings positively as represented in curve F. Transistor 32 is rendered conductive during the initial portion of that interval since the potential of its emitter is more negative than that of its base. Accordingly, its collector potential swings negatively as represented by curve E during the initial portion of the interval $t_0$–$t_3$. The duration of this negative swing is, however, to be curtailed by the operation of the transistor in the manner to be explained next.

During the interval $t_0$–$t_1$, the potential of the capacitor 30 increases to a level $x$—$x$ represented in curve D whereupon the potential of the base of transistor 33 becomes sufficiently positive with reference to that of its emitter that the transistor is rendered conductive and translates current through the diode 39 and resistor 19. With the increasing current flow through transistor 33, the potential of the emitter of transistor 32 becomes more positive with relation to that of its base. This reduces the current flow through the transistor 32 and causes its collector potential to rise positively as represented by curve E during the interval $t_1$–$t_2$. At the same time, the potential appearing across the capacitor 30, and hence at the base of transistor 33, continues to increase in a positive direction so that the transistor conducts more heavily until time $t_2$. At that time the emitter-base diode of the emitter-follower transistor 31 conducts because of the potential thereacross, and this clamps the potential of the capacitor 30 and base of transistor 33 at the level $y$—$y$ represented in curve D. At time $t_2$ the transistor 32 ceases to conduct, thus terminating the first output pulse of curve E developed at its collector and hence between the output terminals 37, 37. Similarly the collector potential of transistor 33 ceases to change at time $t_2$ and the first positive output pulse of curve F appearing at terminals 38, 38 ends. The pulses of curves E and F have the same duration and amplitudes and hence are complementary.

At time $t_3$ the trailing edge of the first pulse of curve A swings negatively, thereby simultaneously establishing the trailing edges of the first pulses of curves B and C. The abrupt negative swing of the pulse of curve C applied to the base electrode of transistor 31 at time $t_3$ renders the latter heavily conductive, thereby causing the potential of the capacitor 30 to change suddenly in the negative direction as represented in curve D. Capacitor 30 discharges abruptly through the transistor 31 until it reaches substantially the potential of the source —E′, where it remains until the next positive pulse of curve A is applied to the input terminals 12, 12. Thereafter the described cycle of operation is repeated for each succeeding pulse such as those appearing during the interval $t_4$–$t_7$.

It will be seen that the capacitor 30 has a discharging time through the transistor 31 which is extremely short and is much shorter than its charging time through the resistor 29. This fast recovery time affords the important advantage of permitting operation at higher repetition rates of the applied triggering pulses. Adjustment of the condenser 30 is effective to vary the slope of the leading edges of the pulses of curve D and the timing of the levels $x$—$x$ and $y$—$y$ with relation to the times $t_0$ and $t_4$, and this adjustment in turn establishes the durations of the output pulses of curves E and F.

Figure 3:
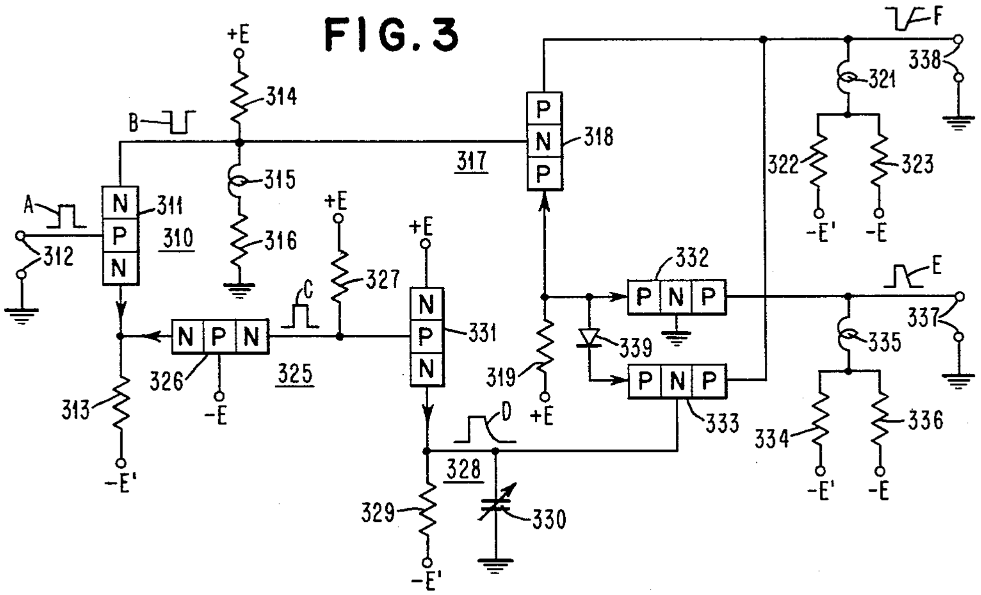
FIG. 3 is a circuit diagram of a modified form of the generator of FIG. 1.

*Description of and explanation of operation of FIG. 3 pulse generator*

Referring now to FIG. 3, there is represented a pulse generator which is generally similar to that of FIG. 1, differing essentially therefrom in the substitution of transistors of the opposite type in corresponding locations and in the use of suitable arrangements for supplying the proper biasing for those transistors. Accordingly, corresponding elements in FIG. 3 are designated by the same reference numerals employed in FIG. 1 but with the prefix 300 added thereto.

Figure 4:
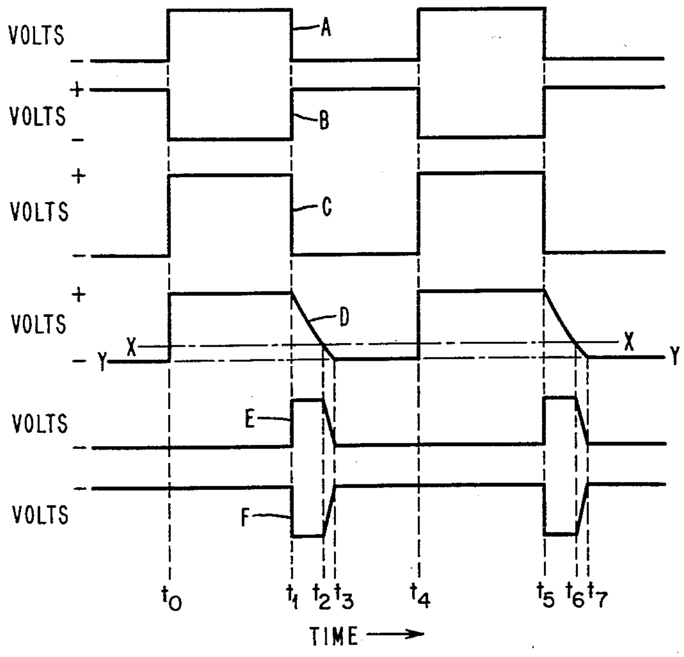
FIG. 4 is another timing chart employed in explaining the operation of the FIG. 3 generator.

Positive polarity triggering pulses as represented by curve A of FIG. 4 are applied to the input terminals 312, 312 and develop at the collector of transistor 311 and the base of transistor 331, the pulses of curves B and C respectively. During the interval $t_0$–$t_1$, the transistors 311 and 318 are turned on, transistors 326 and 332 are turned off, and transistor 331 is rendered conductive. When the latter becomes conductive, the capacitor 330 charges quickly to substantially the positive potential of the source +E, as represented by curve D. At time $t_1$, which marks the trailing edges of the first pulses of curves A, B, and C, the negative swing of the potential on the base electrode of transistor 331 renders the latter nonconductive and the capacitor 330 begins to discharge exponentially through the resistor 329 toward the negative potential of the source —E′. Transistor 318 in channel 317 is rendered non-conductive at time $t_1$ by the positive swing of its base electrode, and a negative output pulse is initiated at output terminals 338, 338 as represented by curve F. When transistor 332 is turned on at time $t_1$, a positive-going pulse is initiated at its collector electrode and hence at the output terminals 337, 337 as represented by curve E.

During the interval $t_1$–$t_3$ when the potential across the capacitor 330 and hence on the base of transistor 333 becomes more negative, that potential reaches a value or level $x$—$x$ (see curve D) such as at time $t_2$. Since this potential is more negative than that appearing on its emitter, the transistor 333 begins to draw current through the resistor 319 and the diode 339, whereupon its collector potential proceeds to increase abruptly in a positiated at output terminals 338, 338 as represented by curve F. The increase in current through the transistor 333 during the interval just mentioned soon renders the emitter of transistor 332 less positive than its base and the transistor then becomes less conductive. Its collector potential swings negatively during the interval $t_2$–$t_3$ as represented in curve E and at time $t_3$ the transistor becomes nonconductive, thus terminating the trailing edge of the first pulse of curve E at its most negative value. After the time $t_2$, the potential on the base of transistor 333 falls below the level $x$—$x$ represented in curve D and the emitter-base diode of the emitter-follower transistor 331 conducts, thus clamping at time $t_3$ the potential of the capacitor 330 and the base of transistor 333 at the level $y$—$y$ represented in curve D. The first pulse of curve E terminates at the same time as the complementary output pulse of curve F.

During the interval $t_4$–$t_7$ the cycle of operation repeats itself and the second pair of complementary output pulses of curves E and F are developed at time $t_5$–$t_7$. These output pulses have polarities which are the opposite of those appearing at the corresponding output terminals of the FIG. 1 generator.

Figure 5:
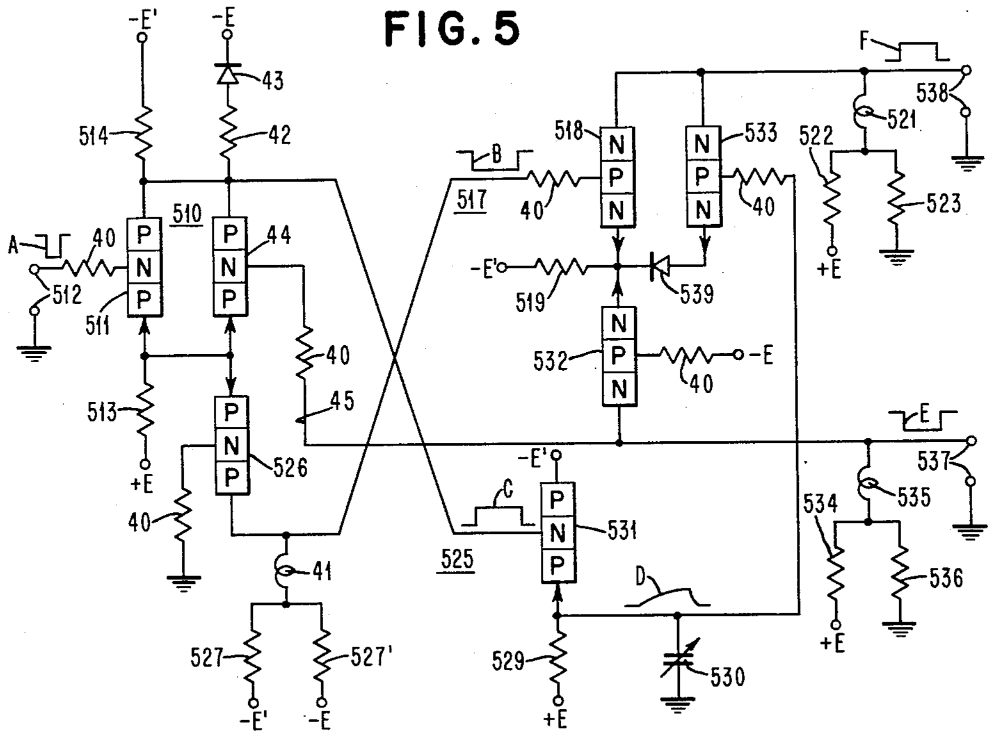
FIG. 5 is a circuit diagram of another embodiment of the present invention.

*Description of FIG. 5 pulse generator*

From the foregoing explanations of the operation of the triggered pulse generators of FIGS. 1 and 3, it will be observed in each instance that the applied trigger pulses have durations which are greater than those of the output pulses. For some applications it is desirable that the generator be capable of developing output pulses having widths which selectively may be made either greater or less than those of the triggering pulses. The pulse generators to be described hereinafter are of the last-mentioned type.

Referring now to FIG. 5, the pulse generator there represented is generally similar to that of FIG. 1 but for certain differences to be pointed out hereinafter. Accordingly, elements in the FIG. 5 embodiment are designated by the same reference numerals employed in FIG. 1 but with the number or suffix 500 added thereto. When drift transistors are employed in the various locations, in lieu of alloy-junction transistors, current-limiting resistors 40 are preferably connected to their bases. It will be noted that the collector connections of the transistors 511 and 526 have been transposed with reference to the corresponding connections in FIG. 1, and are connected respectively to the base of transistor 531 and to the base of transistor 518. Transistor 531 is preferably an alloy junction transistor in view of the larger swing of its emitter-base voltage which might break down a drift transistor were it employed in that location. A peaking inductor 41 is employed in the collector biasing network for transistor 526.

The generator includes an additional transistor 44 which has its emitter and collector connected to the emitter and collector of transistor 511, the collector further being connected to a source —E through a resistor 42 and a diode 43 poled in the direction of collector current flow. The base of transistor 44 is connected to the collector of transistor 532 through a resistor 40 and a conductor 45.

*Explanation of operation of FIG. 5 generator*

Figure 6:
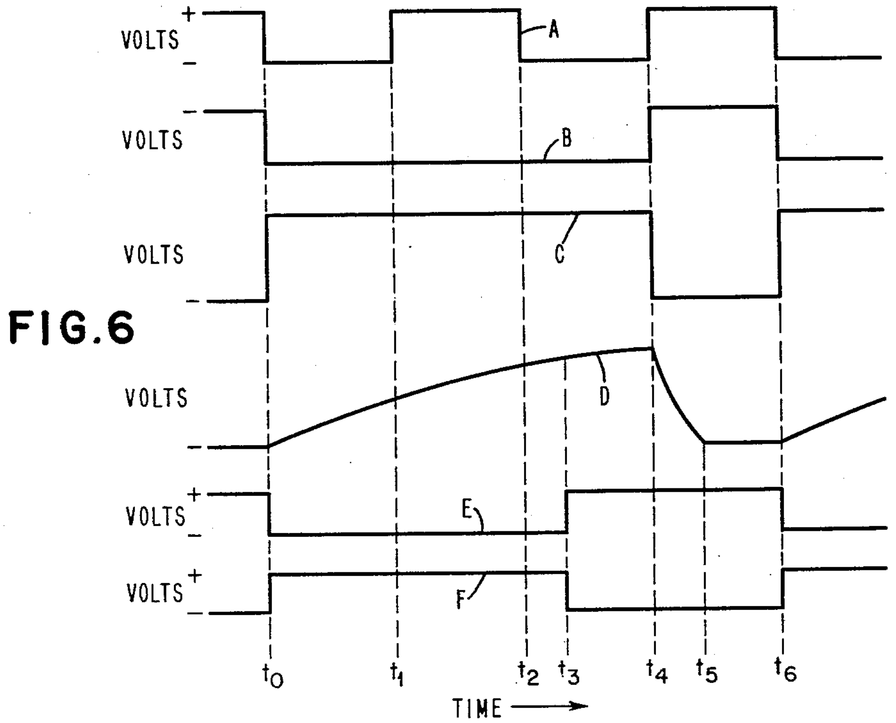
FIG. 6 is a set of waveforms which has an enlarged time scale and is useful in understanding the operation of the pulse generator of FIG. 5.

In considering the operation of the pulse generator of FIG. 5, it will be assumed that the capacitor 530 has been adjusted to develop at the generator output terminals 537 and 538 the output pulses of curves E and F, respectively of FIG. 6, in response to the shorter duration negative-polarity pulses of curve A applied to input terminals 512, 512. It will be understood, however, that the generator of FIG. 5 may be set to develop output pulses of shorter durations than the triggering pulses. Prior to the moment $t_0$, the operating potentials for the transistors 526, 518, and 531 are such that they are conducting while the remaining transistors are in their nonconductive state. The application of the first negative going pulse of curve A to the input terminals 512, 512 renders transistor 511 conductive and diverts the current flowing through the transistor 526 from the substantially constant current source comprising the resistor 513 and source +E to the emitter-collector path of transistor 511. Transistor 526 becomes non-conductive and develops a negative potential pulse for application to the base of transistor 518, thereby turning it off. This causes the collector potential of the latter to rise and the positive-going wave of curve F is initiated at time $t_0$ at the output terminals 538, 538. When transistor 518 becomes nonconductive, the potential of its emitter and that of the transistor 532 swings sufficiently negatively to render the latter conductive, thereby reducing its collector potential and initiating at time $t_0$ at output terminals 537, 537 the negative-going potential pulse of curve E. This pulse is fed back by the conductor 45 and resistor 40 to the base of transistor 44, thereby turning it on in a manner to share the current with transistor 511.

When either of the transistors 511 and 44 is conductive, a positive-polarity pulse is initiated at time $t_0$ at its collector and applied to the base of the emitter-follower transistor 531, thereby rendering it nonconductive at that instant. The condenser 530 in its emitter circuit proceeds to charge exponentially in a positive sense toward the potential of the source +E as represented in curve D of FIG. 6. At time $t_1$ the trailing edge of the first pulse of curve A occurs but it is then ineffective to alter the operation of the transistor 511 because of the existing current flow through transistor 44. Curves B and E continue at time $t_1$ to remain at their negative levels as represented while curves C and F remain at their positive levels. The termination of the second pulse of curve A at time $t_2$ does not affect the levels of the various pulses just mentioned.

The potential across the capacitor 530, and hence that at the base of transistor 533, continues to rise during the interval $t_1$–$t_2$ as represented in curve D. At time $t_2$ the leading edge of the second pulse of curve A occurs. Since transistor 44 is still conducting, the described operation in relation to the voltage waves of curves B–F, inclusive, of FIG. 2 still pertains. However, at time $t_3$ the pulse generator experiences a change in its operating condition as will be pointed out presently.

At time $t_3$ the base potential of transistor 533, represented by curve D, has risen to such a level in relation to its emitter potential that hte transistor becomes conductive, thereby raising its emitter potential and that of transistor 532 to a value such that transistor 532 becomes nonconductive. Accordingly, the trailing edge of the output pulse of curve E occurring at time $t_3$ swings positively and in doing so turns off transistor 44, and the turning on of transistor 533 at that same instant establishes the negative swing of the trailing edge of the output pulse represented in curve F. But for the fact that the second negative pulse (see curve A) had been applied starting at time $t_2$ to the base of transistor 511 to render it conductive at time $t_3$ when transistor 44 was turned off, the pulses of curves B and C and the charging of the capacitor 30 would terminate at time $t_3$. Capacitor 530 therefore continues to charge until the emitter potential of transistor 531 becomes more positive than its base potential, thereby clamping it at that level. At time $t_4$ the trailing edge of the second pulse of curve A applied to the base of transistor 511 swings positively and renders the transistor nonconductive. The resultant potential changes appearing at time $t_4$ at the base electrodes of transistors 518 and 531 are in a sense to render both conductive. When the latter becomes conductive the capacitor 530 discharges rather abruptly through transistor 531 in the manner represented by curve D during the interval $t_4$–$t_5$ until it substantially reaches the potential of the source —E at time $t_5$. It will be observed that the discharge time of capacitor 530 is much less than its charging time, it being of the order of $1/\alpha'$ of its charging time. Time $t_6$ marks the leading edge of the third applied triggering pulse and initiates another cycle of operation such as that just explained wherein the output pulses of the generator have durations greater than that of the applied input pulses. It should be understood, however, that suitable adjustment of the capacitor 530 will be effective to develop output pulses having durations less than that of the input pulses.

From the foregoing description and explanation of the FIG. 5 embodiment of the invention, it will be seen that the transistor 44 and the feedback connection including the conductor 45 and resistor 43 from the collector of transistor 532 to the base of transistor 44 comprise a control means responsive to the pulse-type signal of curve E for rendering the transistor 511 unresponsive to at least some of the triggering pulses of curve A having durations less than those of the signal of curve E. For the adjustment of capacitor 530 considered, the transistor 511 was unresponsive to the triggering pulse occurring at time $t_2$–$t_4$ and hence to alternate ones of the triggering pulses.

Figure 7:
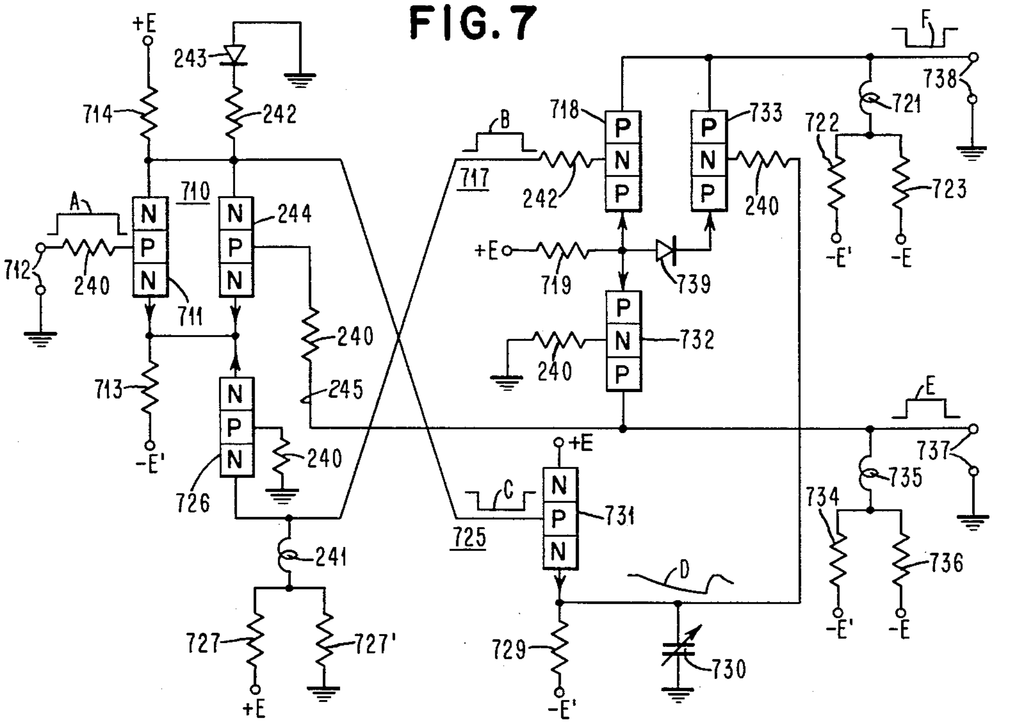
FIG. 7 is a circuit diagram of a modification of the generator of FIG. 5.

*Description of and explanation of operation of FIG. 7 generator*

Referring now to FIG. 7 of the drawings, there is represented a pulse generator generally similar to that of FIG. 5 but for the use of transistors of the opposite type in corresponding locations and the proper biasing sources or networks therefor. Accordingly corresponding components in FIG. 7 are designated by the same reference numerals employed in FIG. 5 but with the number 200 added thereto. While the pulse generator of FIG. 7 may, like the generator of FIG. 5, be employed selectively to develop output pulses having either longer or shorter durations than the input pulses, its operation will be explained briefly in connection with the generation of latter situation.

Figure 8:
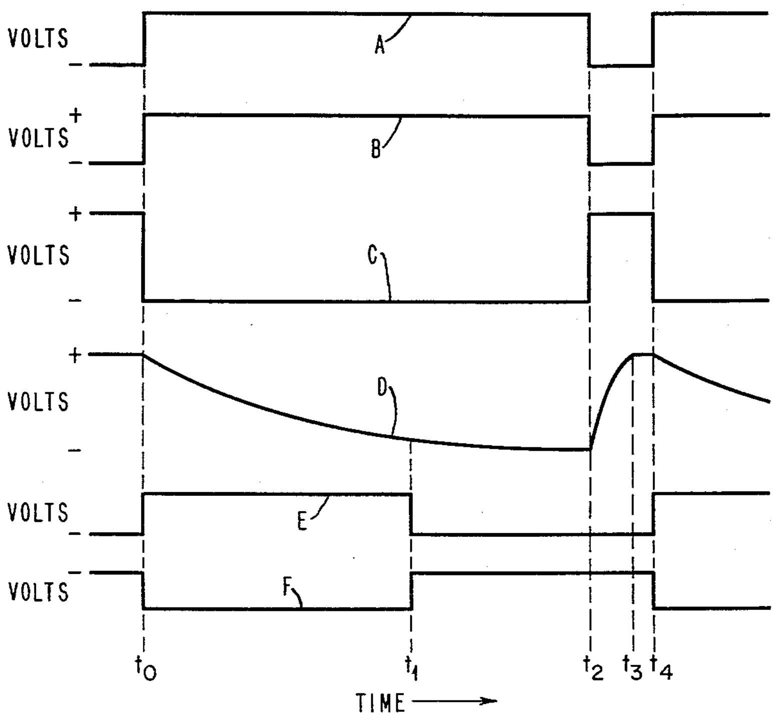
FIG. 8 is another set of waveforms used in explaining the operation of the pulse generator of FIG. 7.

At time $t_0$ the positive triggering pulse of curve A of FIG. 8 which is applied to the base of transistor 711 renders it conductive and there is developed for simultaneous application to the bases of transistors 718 and 731, respectively, the positive pulse of curve B and the the negative pulse of curve C. Transistor 718 is turned off at time $t_0$ and this initiates the negative pulse of curve F at its collector and at the output terminals 738, 738. At the same time transistor 732 becomes conductive and its collector potential, and hence that at output terminals 737, 737, becomes more positive as represented by curve E.

The negative pulse of curve C renders the emitter-follower transistor 731 nonconductive at time $t_0$ and the capacitor 730 proceeds to discharge exponentially, as represented in curve D, through the resistor 729 toward the potential of the source —E'. At time $t_1$ the potential of the base of transistor 733 has decreased to such a value in relation to that at its emitter that the transistor starts to conduct. Current flow is swiched at time $t_1$ from the transistor 732 to the transistor 733. Changes in the collector potentials of those transistors result and those changes appear at the output terminals 737, 737 and 738, 738 as may be seen in curves F and E. During the interval $t_0$–$t_1$ the positive pulse of curve E which is fed back by conductor 245 and resistor 240 to the base of transistor 244 may cause the latter to become conductive and share current flow with the transistor 711 which has a longer duration positive pulse applied to its base to keep it conductive. Consequently transistors 718 and 731 remain conductive for the entire duration of the interval $t_0$–$t_2$ of the applied positive pulse of curve A.

At time $t_2$ when that applied pulse terminates, the potential on the base of the emitter-follower transistor 731 rises sufficiently to render it conductive, thereby charging the capacitor 730 rather abruptly in the manner represented by curve D during the interval $t_2$–$t_4$ to substantially the level of the source +E. At time $t_4$ another positive pulse is applied to the input terminals 712, 712 and the cycle of operation explained above is repeated.

From the foregoing explanation of the FIGS. 5 and 7 embodiments of the invention, it will be understood that the transistor 244 is effective only during the generation of output pulses having durations greater than those of the input pulses.

While applicant does not wish to be limited to any particular set of circuit constants, the following constants have proved useful in a transistor pulse generator of the type represented in FIG. 5:

| | |
|---|---|
| Resistor 40 | 82 ohms |
| Resistor 42 | 330 ohms |
| Resistors 513 and 519 | 910 ohms |
| Resistor 514 | 2.4 kilohms |
| Resistors 522 and 534 | 2.5 kilohms |

| | |
|---|---|
| Resistors **523** and **536** | 250 ohms |
| Resistor **529** | 10 kilohms |
| Condenser **530** | 5 microfarads (max.) |
| Inductors **41**, **521** and **537** | 2.7 microhenries |
| Transistors **44**, **511**, **528** | IBM Type 15 Drift |
| Transistors **518**, **532**, **533** | IBM Type 65 Drift |
| Transistor **531** | IBM Type 01 Alloy Junction |
| —E | —6 volts |
| —E' | —12 volts |
| +E | +6 volts |
| Input pulse amplitude | 0.8 volt |
| Voltage level change | +0.4 to —0.4 volt |
| Output pulses: | |
| Voltage level change | +0.4 to —0.4 volt |
| Repetition rate depending upon selected pulse width | 1 kilocycle to 1 megacycle |
| Approximate pulse widths | 100 millimicroseconds–10 milliseconds. |

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A transistor pulse generator comprising transistor means responsive to applied triggering pulses for deriving a pair of pulse-type output signals representative of said triggering pulses; a first transistor channel coupled to said means for translating one of said output signals; a second channel including a non-saturating transistor circuit having an adjustable time-constant network therein and responsive to the other of said output signals for deriving a pulse-type output signal having modified predetermined edge portions which are controlled by the adjustment of said network; and means conjointly responsive to said one output signal and to said modified edge portions for developing a resultant pulse-type signal during said edge portions.

2. A transistor pulse generator comprising transistor means responsive to applied triggering pulses for deriving a pair of pulse-type output signals representative of said triggering pulses, a first transistor channel coupled to said means for translating one of said output signals; a second channel including a non-saturating emitter-follower transistor circuit having an adjustable time-constant network therein and responsive to the other of said output signals for controlling the charging and discharging of said network to derive a pulse-type output signal having modified predetermined edge portions which are controlled by the adjustment of said network; and means conjointly responsive to said one output signal and to said modified edge portions for developing a resultant pulse type signal only during said edge portions.

3. A transistor pulse generator comprising transistor means responsive to applied triggering pulses for deriving a pair of pulse-type output signals representative of said triggering pulses; a first transistor channel coupled to said means for translating one of said output signals; a second channel including a non-saturating transistor circuit having an adjustable time-constant network therein and responsive to the other of said output signals for deriving a pulse-type output signal having modified predetermined edge portions which are controlled by the adjustment of said network; means conjointly responsive to said one output signal and to said modified edge portions for developing a first resultant pulse-type signal during said edge portions; and means coupled to said first channel for deriving a second pulse-type signal which has a waveform that corresponds to that of said first signal but is of the opposite polarity.

4. A transistor pulse generator comprising transistor means responsive to applied triggering pulses and having a pair of output circuits for deriving therein a pair of pulse-type output signals representative of said triggering pulses; a first transistor channel connected to one of said output circuits for translating one of said output signals; a second channel connected to the other of said output circuits and including a non-saturating transistor circuit having an adjustable time-constant network therein and responsive to the other of said output signals for deriving a pulse-type output signal having modified predetermined edge portions which are controlled by the adjustment of said network; and means conjointly responsive to said one output signal and to said modified edge portions for developing a resultant pulse-type signal only during said edge portions.

5. A transistor pulse generator comprising transistor means responsive to applied triggering pulses for deriving a pair of pulse-type output signals representative of said triggering pulses; a first transistor channel coupled to said means for translating one of said output signals; a second channel including a non-saturating ing transistor circuit having an adjustable time-constant network therein and responsive to the other of said output signals for deriving a pulse-type output signal having modified predetermined edge portions which are controlled by the adjustment of said network; and a pair of transistor means one of which is responsive to said one output signal and to the operative condition of the other transistor means of said pair thereof and said other of which is responsive to the operative condition of said one transistor means of said pair thereof and to said modified edge portions for developing a resultant pulse-type signal only during said edge portions.

6. A transistor pulse generator comprising transistor means including a transistor of one conductivity type responsive to applied triggering pulses for deriving a pair of pulse-type output signals representative of said triggering pulses; a first transistor channel including a transistor of the opposite conductivity type coupled to said means for translating one of said output signals; a second channel including a non-saturating emitter-follower transistor circuit having a transistor of said one type and having an adjustable time-constant network therein, said emitter-follower circuit being responsive to the other of said output signals for controlling the charging and discharging of said network to derive a pulse-type output signal having modified predetermined edge portions which are controlled by the adjustment of said network; and means including a pair of transistors of said opposite type conjointly responsive to said one output signal and to said modified edge portions for developing a resultant pulse-type signal only during said edge portions.

7. A transistor pulse generator comprising transistor means responsive to applied triggering pulses for deriving a pair of pulse-type output signals representative of said triggering pulses and having opposite polarities, a first transistor channel connected to said means for translating one of said output signals of one polarity; a second channel including a non-saturating transistor circuit having an adjustable time-constant network therein and responsive to said output signal of the opposite polarity for deriving a pulse-type output signal having modified predetermined edge portions which are controlled by the adjustment of said network; means conjointly responsive to said output signal of one polarity and to said modified edge portions for developing a resultant pulse-type signal only during said edge portions; and means connected between said first translating channel and said conjointly responsive means for deriving a second pulse-type signal which has a waveform that corresponds with that of said first signal but is of the opposite polarity.

8. A transistor pulse generator comprising transistor means responsive to applied triggering pulses for deriving a pair of pulse type output signals representative of said triggering pulses; a first transistor channel connected to said means for translating one of said output signals; a second channel including a transistor circuit having an adjustable time-constant network therein and responsive to the other of said output signals for deriving a pulse-type output signal having modified predetermined edge portions which are controlled by the adjustment of said network; means conjointly responsive to said one output signal and to said modified edge portions for developing during said edge portions a resultant pulse-type signal pulse which may be less than or greater than triggering pulses; and control means responsive to said pulse-type signals and coupled to said transistor means for rendering the latter unresponsive to at least some of said triggering pulses having durations less than those of said resultant signal.

9. A transistor pulse generator comprising transistor means responsive to applied triggering pulses for deriving a pair of pulse-type output signals representative of said triggering pulses; a first transistor channel connected to said means for translating one of said output signals; a second channel including a transistor circuit having an adjustable time-constant network therein and responsive to the other of said output signals for deriving a pulse-type output signal having modified predetermined edge portions which are controlled by the adjustment of said network; means conjointly responsive to said output signal of one polarity and to said modified edge portions for developing during said edge portions a resultant pulse-type signal having pulse durations selectively by said adjustment and which may be less than or greater than the durations of said triggering pulses; and a transistor effectively connected in parallel with said transistor means and responsive to said resultant signal for rendering said transistor means unresponsive to at least some of said triggering pulses having durations less than those of said resultant signal.

10. A transistor pulse generator comprising transistor means responsive to applied triggering pulses for deriving a pair of pulse-type output signals representative of said triggering pulses and having opposite polarities; a first transistor channel connected to said means for translating one of said ouput signals of one polarity; a second channel including a transistor circuit having an adjustable time-constant network therein and responsive to said output signal of the opposite polarity for deriving a pulse-type output signal having modified predetermined edge portions which are controlled by the adjustment of said network; means conjointly responsive to said output signal of one polarity and to said modified edge portions for developing during said edge portions a resultant pulse-type signal having pulse durations selectively established by said adjustments and which may be less than or greater than the durations of said triggering pulses; control means responsive to said resultant signal and coupled to said transistor means for rendering the latter unresponsive to at least some of said triggering pulses having duration less than those of said resultant signal; and means coupled to said first channel for deriving a second pulse-type signal which has a waveform that corresponds to that of said resultant signal but is of the opposite polarity.

11. A transistor pulse generator comprising transistor means responsive to applied triggering pulses for deriving a pair of pulse-type output signals representative of said triggering pulses and having opposite polarities; a first transistor channel connected to said means for translating one of said output signals of one polarity; a second channel including a transistor circuit having an adjustable time-constant network therein and responsive to said output signal of the opposite polarity for deriving a pulse-type output signal having modified predetermined edge portions which are controlled by the adjustment of said network; a pair of transistor means one of which is conjointly responsive to said output signal of one polarity and to the operative condition of the other transistor means of said pair thereof and said other of which is responsive to the operative condition of said one transistor means of said pair thereof and to said modified edge portions for developing during said edge portions a resultant pulse-type signal having durations selectively established by said adjustment and which may be less than or greater than the durations of said triggering pulses; a transistor effectively connected in parallel with said first-mentioned transistor means and responsive to said resultant signal for rendering said first-mentioned transistor means unresponsive to at least some of said triggering pulses having durations less than those of said resultant signal; and means coupled to said first channel for deriving a second pulse-type signal which has a waveform that corresponds to that of said resultant signal but is of the opposite polarity.

12. A transistor pulse generator comprising transistor means including a transistor of one conductivity type responsive to applied triggering pulses for deriving a pair of pulse-type output signals representative of said triggering pulses and having opposite polarities; a first transistor channel including a transistor of the opposite conductivity type coupled to said means for translating one of said output signals of one polarity; a second channel including an emitter-follower transistor circuit having a transistor of said one type and having an adjustable time-constant network therein, said emitter-follower circuit being responsive to said output signal of the opposite polarity for controlling the charging and discharging of said network to derive a pulse-type output signal having modified predetermined edge portions which are controlled by the adjustment of said network; means including a pair of transistors of said opposite type conjointly responsive to said output signal of one polarity and to said modified edge portions for developing during said edge portions a resultant pulse-type signal having durations which may be less than or greater than the durations of said triggering pulses; and a transistor of said one type effectively connected in parallel with said first-mentioned transistor and responsive to said resultant signal for rendering said transistor means unresponsive to at least some of said triggering pulses having durations less than those of said resultant signal.

References Cited in the file of this patent

UNITED STATES PATENTS

| | | |
|---|---|---|
| 2,845,547 | Althouse | July 29, 1958 |
| 2,845,548 | Silliman et al. | July 29, 1958 |
| 2,871,378 | Lohman | Jan. 27, 1959 |
| 2,892,953 | McVey | June 30, 1959 |
| 2,906,817 | Kidd et al. | Sept. 29, 1959 |

UNITED STATES PATENT OFFICE
CERTIFICATE OF CORRECTION

Patent No. 3,018,390 January 23, 1962

Hannon S. Yourke et al.

It is hereby certified that error appears in the above numbered patent requiring correction and that the said Letters Patent should read as corrected below.

Column 2, line 68, after "which" insert -- forwardly biases the transistor, while --; column 5, lines 58 and 59, for "positiated at output terminals 338, 338" read -- positive direction during the interval $t_2$-$t_3$--; column 7, line 32, for "hte" read -- the --.

Signed and sealed this 29th day of May 1962.

(SEAL)
Attest:

ERNEST W. SWIDER
Attesting Officer

DAVID L. LADD
Commissioner of Patents